US012586896B2

(12) United States Patent
Gong et al.

(10) Patent No.: US 12,586,896 B2
(45) Date of Patent: Mar. 24, 2026

(54) ANTENNA STRUCTURE AND ELECTRONIC DEVICE

(71) Applicant: Wistron NeWeb Corporation, Hsinchu (TW)

(72) Inventors: Yi-Ping Gong, Hsinchu (TW); Hong-Jun Jian, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 57 days.

(21) Appl. No.: 18/828,064

(22) Filed: Sep. 9, 2024

(65) Prior Publication Data

US 2025/0300341 A1 Sep. 25, 2025

(30) Foreign Application Priority Data

Mar. 19, 2024 (TW) ................................ 113110044

(51) Int. Cl.
*H01Q 1/44* (2006.01)
*H01Q 1/02* (2006.01)
*H01Q 1/22* (2006.01)
*H01Q 5/371* (2015.01)
*H01Q 5/385* (2015.01)

(52) U.S. Cl.
CPC ................ *H01Q 1/44* (2013.01); *H01Q 1/02* (2013.01); *H01Q 1/2266* (2013.01); *H01Q 5/371* (2015.01); *H01Q 5/385* (2015.01)

(58) Field of Classification Search
CPC .......... H01Q 1/02; H01Q 1/44; H01Q 1/2266; H01Q 5/364-371
See application file for complete search history.

(56) References Cited

U.S. PATENT DOCUMENTS

2006/0071308 A1* 4/2006 Tang .................... H01Q 1/2283 257/E25.012
2012/0242555 A1* 9/2012 Hsieh ..................... H01Q 5/378 343/860
2017/0264016 A1* 9/2017 Huang ..................... H01Q 7/00
2017/0309986 A1* 10/2017 Wang ..................... H01Q 5/378
2019/0020111 A1* 1/2019 Tseng ..................... H01Q 5/328
2020/0358196 A1* 11/2020 Samardzija ............ H01Q 13/10
2022/0247078 A1* 8/2022 Wang ..................... H01Q 5/378
2022/0304187 A1* 9/2022 Pu .......................... H01Q 1/273
2022/0352625 A1* 11/2022 Wu ........................ H01Q 5/371
2023/0411828 A1* 12/2023 Peng ...................... H01Q 5/371
(Continued)

FOREIGN PATENT DOCUMENTS

CN 115395225 A * 11/2022 ............... H01Q 1/38
TW I280683 B1 * 5/2007
(Continued)

*Primary Examiner* — Ab Salam Alkassim, Jr.
(74) *Attorney, Agent, or Firm* — McClure, Qualey & Rodack, LLP

(57) ABSTRACT

The antenna structure is disposed on a heat sink. The heat sink includes a top cover. The antenna structure includes a feeding portion, a grounding portion, and a radiation portion. A vertical projection of the radiation portion is completely overlapped with the top cover of the heat sink. The radiation portion includes a first branch and a second branch. One end of the second branch is vertically connected to the first branch, and another end of the second branch is connected to the feeding portion.

16 Claims, 9 Drawing Sheets

(56) References Cited

U.S. PATENT DOCUMENTS

| | | | | |
|---|---|---|---|---|
| 2023/0411853 | A1* | 12/2023 | Wu | H01Q 9/0421 |
| 2025/0062532 | A1* | 2/2025 | Chen | H01Q 5/307 |
| 2025/0105512 | A1* | 3/2025 | Zhu | H01Q 5/328 |
| 2025/0112370 | A1* | 4/2025 | Chang | H01Q 9/045 |
| 2025/0132495 | A1* | 4/2025 | Samardzija | H01Q 1/48 |
| 2025/0183535 | A1* | 6/2025 | Wu | H01Q 7/00 |
| 2025/0239771 | A1* | 7/2025 | Zhu | H01Q 1/521 |

FOREIGN PATENT DOCUMENTS

| | | | |
|---|---|---|---|
| TW | 201240212 | A | 10/2012 |
| TW | 202032851 | A | 9/2020 |

* cited by examiner

ANTENNA STRUCTURE AND ELECTRONIC DEVICE

RELATED APPLICATIONS

This application claims the benefit of priority to Taiwan Patent Application No. 113110044, filed on Mar. 19, 2024. The entire content of the above identified application is incorporated herein by reference.

BACKGROUND

Technical Field

The present disclosure relates to an antenna structure and an electronic device, in particular to an antenna structure disposed on a heat sink and an electronic device with such antenna structure.

Description of Related Art

With the increase of the function and efficiency requirements of electronic devices, the installation position and size of antennas in electronic devices are compressed when the volume of electronic devices is limited.

In addition, with the improvement of computer performance, the necessity of a fan, which is one of the cooling systems, is becoming more and more indispensable.

In view of this, the combination of fans and antennas in the limited space of electronic devices to provide a multi-band antenna structure has become a worthy goal for the relevant industry to develop.

SUMMARY

According to one embodiment of the present disclosure, an antenna structure is disposed on a heat sink. The heat sink includes a top cover. The antenna structure includes a feeding portion, a grounding portion, and a radiation portion. The grounding portion is connected to the feeding portion. A vertical projection of the radiation portion is completely overlapped with the top cover of the heat sink. The radiation portion includes a first branch and a second branch. One end of the second branch is vertically connected to the first branch, and another end of the second branch is connected to the feeding portion.

According another embodiment of the present disclosure, an electronic device includes a housing, a heat sink, and an antenna structure. The housing includes a first cover and a second cover. The second cover is relative to the first cover. The heat sink is disposed on the first cover and includes a top cover. The antenna structure is disposed on the heat sink and faces the second cover. The antenna structure includes a feeding portion, a grounding portion, and a radiation portion. The grounding portion is connected to the feeding portion. A vertical projection of the radiation portion is completely overlapped with the top cover of the heat sink. The radiation portion includes a first branch and a second branch. One end of the second branch is vertically connected to the first branch, and another end of the second branch is connected to the feeding portion.

BRIEF DESCRIPTION OF THE DRAWINGS

The described embodiments may be better understood by reference to the following description and the accompanying drawings, in which.

DETAILED DESCRIPTION

Figure 1:
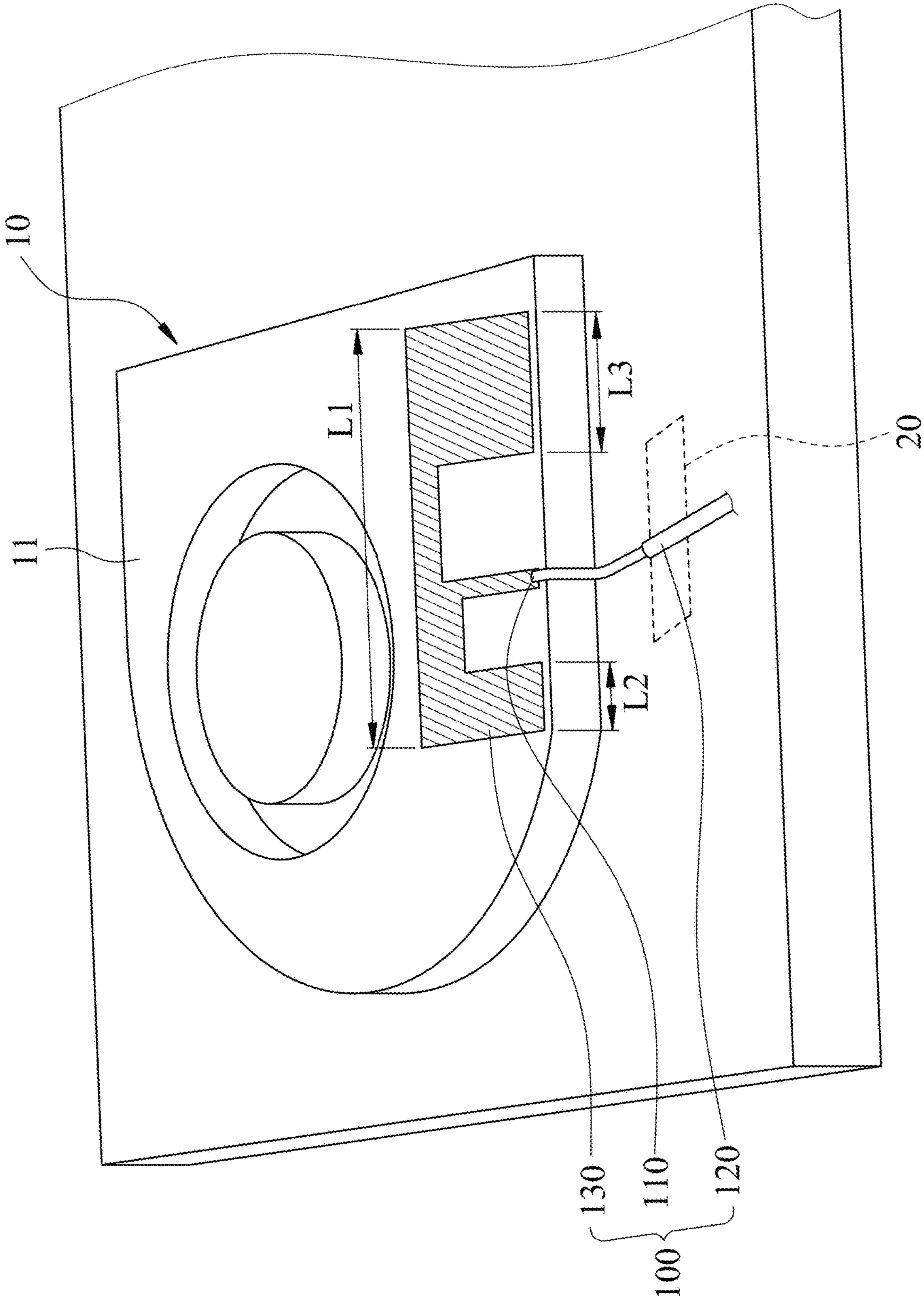
FIG. 1 is a schematic view of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an" and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
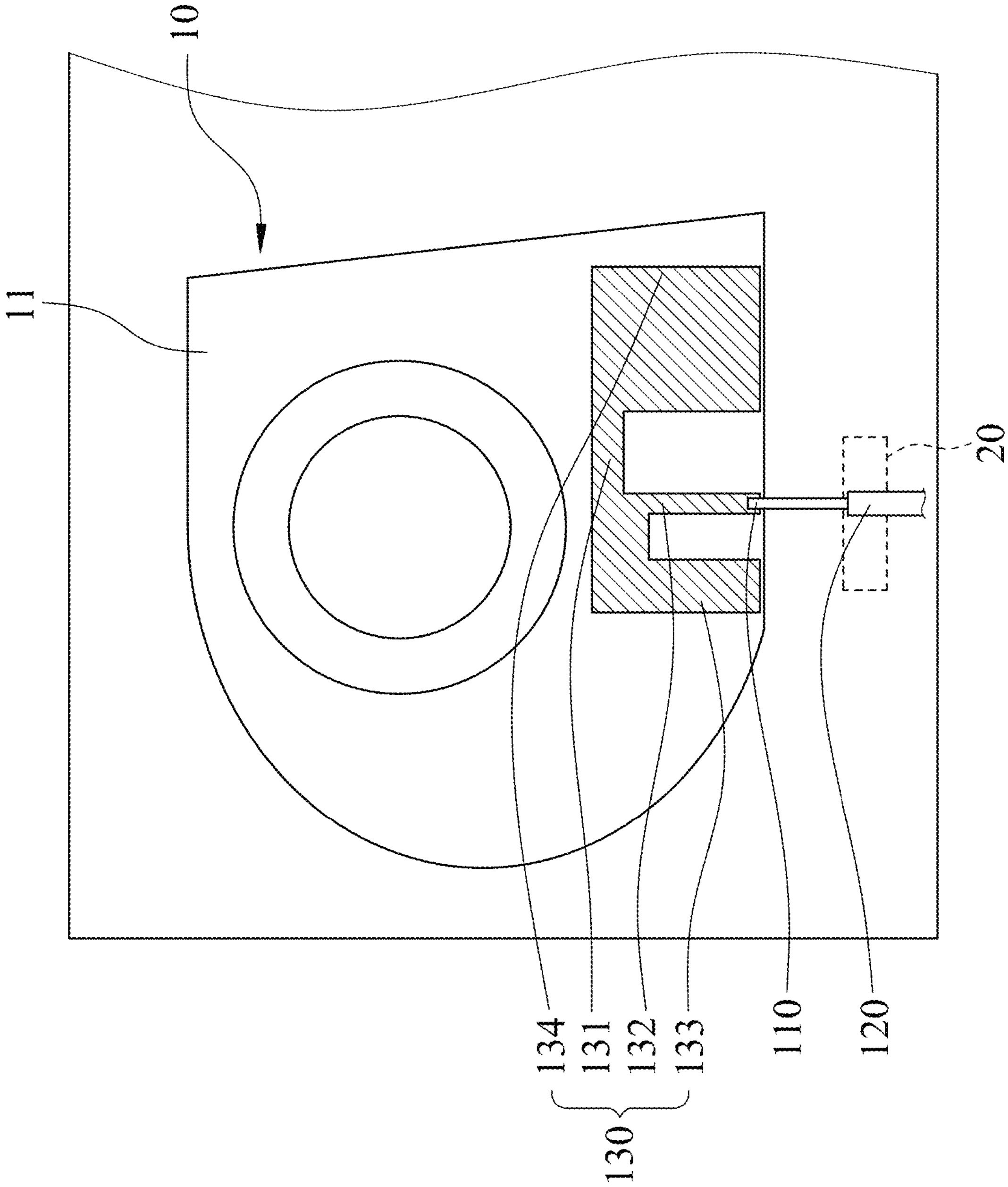
FIG. 2 is a top view of the antenna structure of FIG. 1.

Referring to FIG. 1 and FIG. 2. FIG. 1 is a schematic view of an antenna structure 100 according to a first embodiment of the present disclosure. FIG. 2 is a top view of the antenna structure 100 of FIG. 1. The antenna structure 100 is disposed on a heat sink 10. The heat sink 10 includes a top cover 11. The antenna structure 100 includes a feeding portion 110, a grounding portion 120, and a radiation portion 130. One end of the feeding portion 110 is connected to the radiation portion 130. Another end of the feeding portion 110 is connected to the grounding portion 120. A vertical projection of the radiation portion 130 is completely overlapped with the top cover 11 of the heat sink 10. That is, from the top view of FIG. 2, the radiation portion 130 is completely within the range of the top cover 11. The feeding portion 110 is electrically connected to a coaxial transmission line (reference is omitted) and is connected to a signal source and feeds a signal. The grounding portion 120 is connected to a system ground 20 of a notebook computer. The radiation portion 130 excites the resonant frequency through the signal fed by the feeding portion 110. In the first embodiment, the heat sink 10 is a heat dissipation device for a notebook computer. The radiation portion 130 is formed on the top cover 11 by a laser direct structuring (LDS), but the present disclosure is not limited thereto.

Therefore, by completely overlapping the radiation portion 130 on the top cover 11 of the heat sink 10, the heat sink 10 and the radiation portion 130 can be combined in a limited electronic device space to provide a multi-band antenna structure 100. In addition, the thickness of the antenna structure 100 itself that affects the heat dissipation of the heat sink 10 or the abnormal noise caused by wind shear can also be avoided to the greatest extent.

Figure 3:
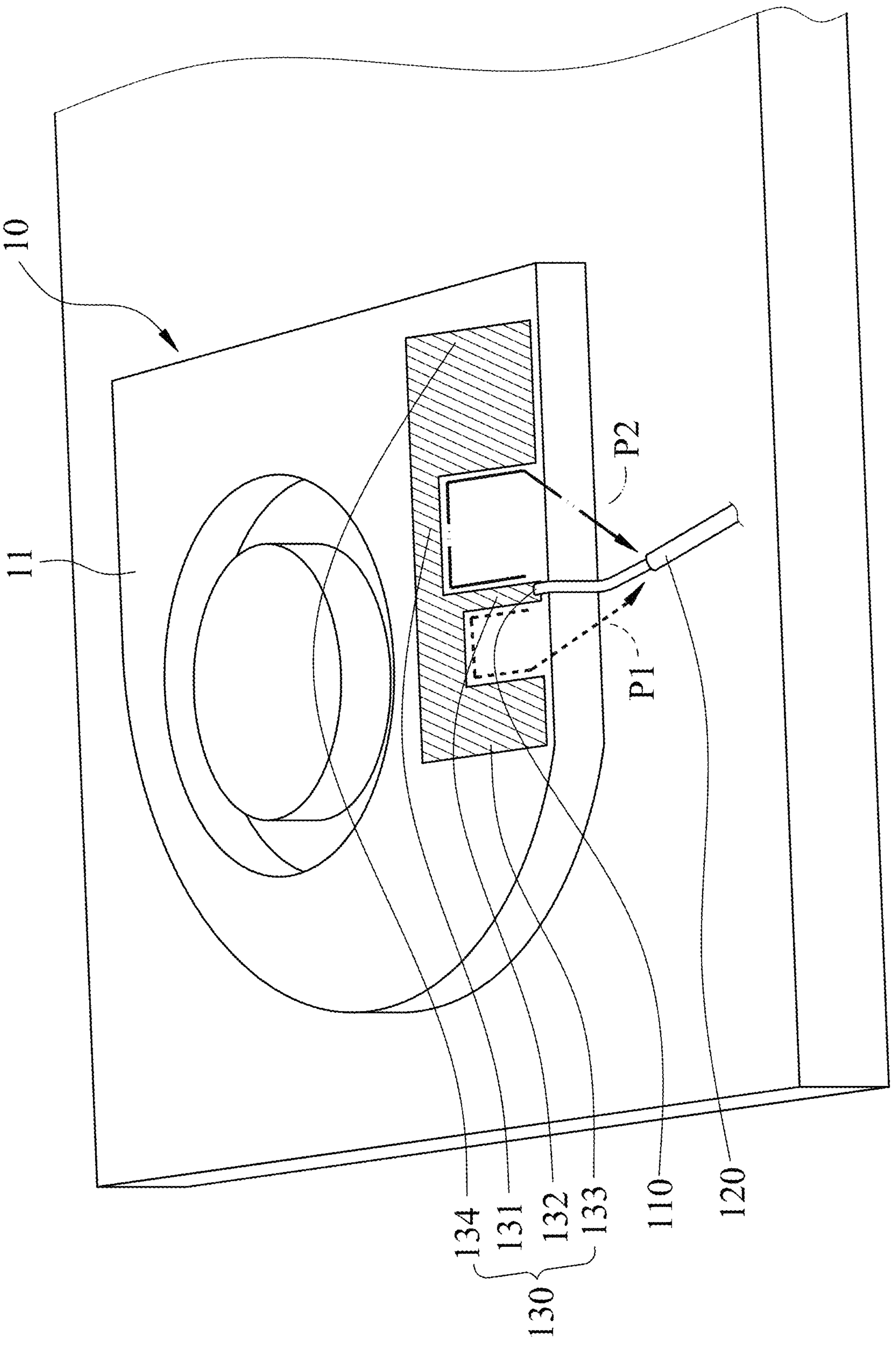
FIG. 3 is a schematic view of a high-frequency path and a low-frequency path according to the antenna structure of FIG. 1.
Figure 4:
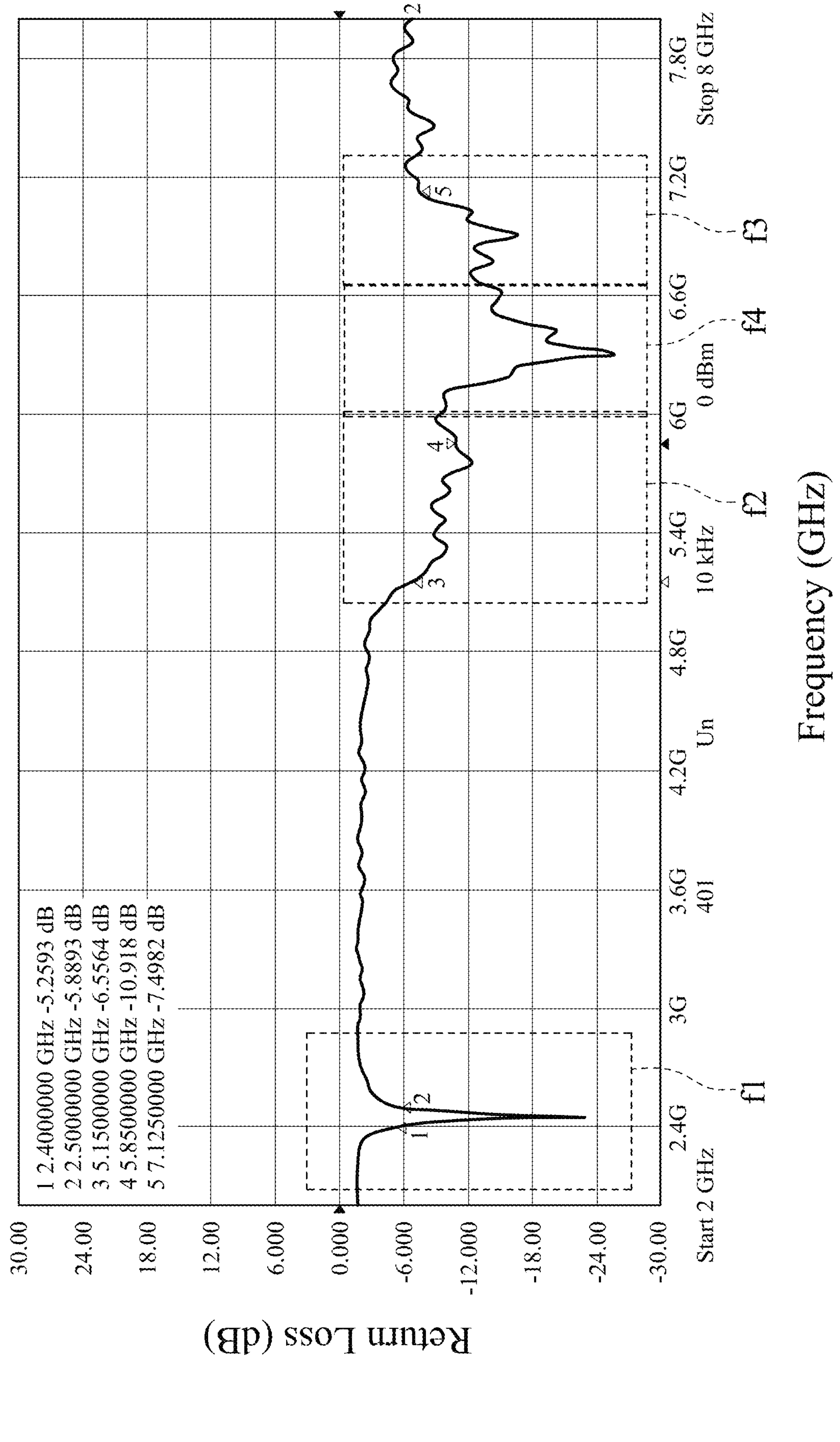
FIG. 4 is an overall bandwidth waveform of frequency and return loss according to the antenna structure of FIG. 1.

Referring to FIG. 1, FIG. 2, FIG. 3, and FIG. 4. FIG. 3 is a schematic view of a high-frequency path P1 and a low-frequency path P2 according to the antenna structure 100 of FIG. 1. FIG. 4 is an overall bandwidth waveform of frequency and return loss according to the antenna structure 100 of FIG. 1. The radiation portion 130 includes a first branch 131, a second branch 132, a third branch 133, and a fourth branch 134. One end of the second branch 132 is vertically connected to the first branch 131, and another end of the second branch 132 is connected to the feeding portion 110. One end of the third branch 133 is vertically connected to one end of the first branch 131. One end of the fourth branch 134 is vertically connected to another end of the first branch 131. The second branch 132 is spaced between the third branch 133 and the fourth branch 134. It is noted that the grounding portion 120 is connected to the second branch 132 only through the feeding portion 110. The first branch 131 has a length L1, the third branch 133 has a length L2, and the fourth branch 134 has a length L3 (as shown in FIG. 1). The length L1 is greater than the length L2 and the length L3. The length L3 is greater than the length L2. In the first embodiment, the length L1 is 36 mm, the length L2 is 8 mm, and the length L3 is 15 mm.

The first branch 131 is configured to excite a first resonant frequency f1 and a second resonant frequency f2, and the first branch 131 corresponds to one-half the wavelength of the first resonant frequency f1. The first resonant frequency f1 is lower than the second resonant frequency f2, and the second resonant frequency f2 is a multiple of the first resonant frequency f1.

In FIG. 3, the radiation portion 130 has a high-frequency path P1 and a low-frequency path P2. The high-frequency path P1 is formed among the feeding portion 110, the second branch 132, the first branch 131, the third branch 133, and the grounding portion 120. The low-frequency path P2 is formed among the feeding portion 110, the second branch 132, the first branch 131, the fourth branch 134, and the grounding portion 120. The high-frequency path P1 is configured to excite a third resonant frequency f3, and the low-frequency path P2 is configured to excite a fourth resonant frequencies f4. The fourth resonant frequency f4 is lower than the third resonant frequency f3.

In FIG. 4, the first resonant frequency f1 is between 2.4 GHz and 2.5 GHz. The second resonant frequency f2 is between 5.15 GHz and 6 GHz. The third resonant frequency f3 between 6.6 GHz and 7.125 GHz. The fourth resonant frequency f4 is between 6 GHz and 6.6 GHz.

Figure 5B:
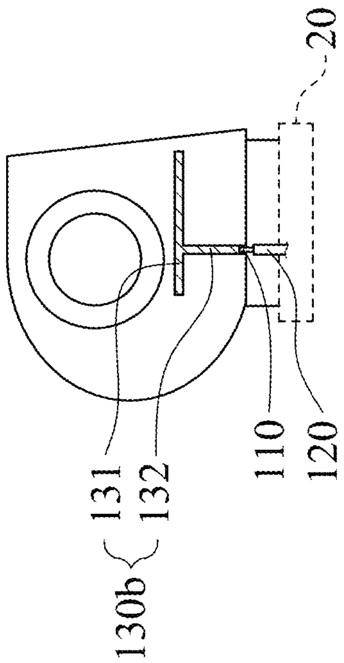
FIG. 5B is a schematic view of a radiation portion according to a third embodiment of the present disclosure.
Figure 5A:
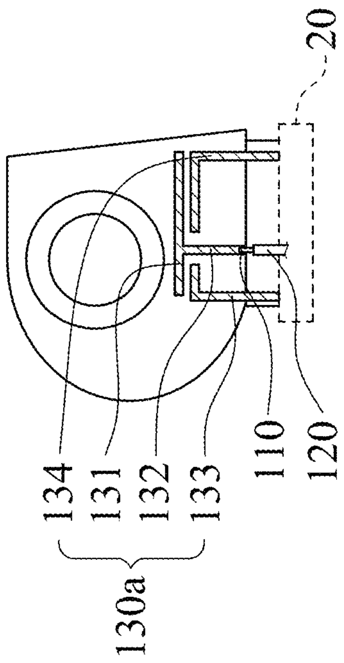
FIG. 5A is a schematic view of a radiation portion according to a second embodiment of the present disclosure.
Figure 5D:
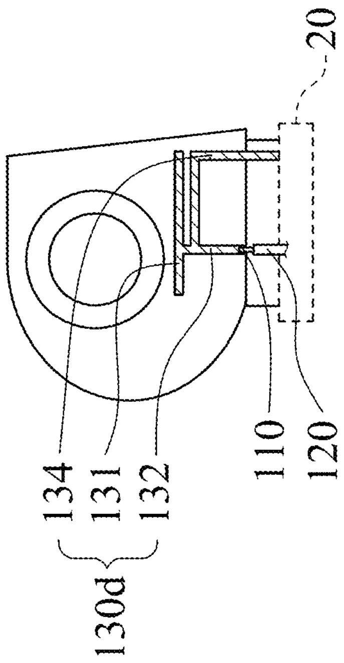
FIG. 5D is a schematic view of a radiation portion according to a fifth embodiment of the present disclosure.
Figure 5C:
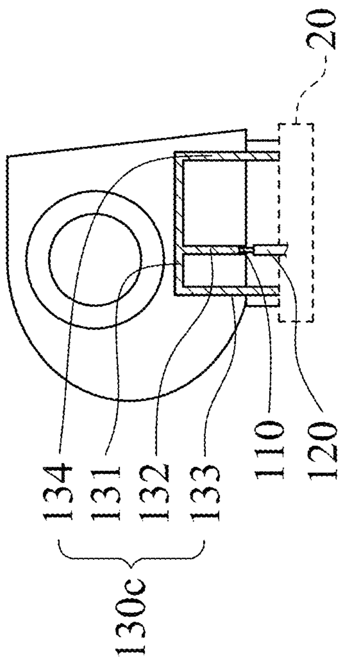
FIG. 5C is a schematic view of a radiation portion according to a fourth embodiment of the present disclosure.

Referring to FIG. 2, FIG. 5A, FIG. 5B, FIG. 5C, and FIG. 5D. FIG. 5A is a schematic view of a radiation portion **130*a* according to a second embodiment of the present disclosure. FIG. 5B is a schematic view of a radiation portion 130*b* according to a third embodiment of the present disclosure. FIG. 5C is a schematic view of a radiation portion 130*c* according to a fourth embodiment of the present disclosure. FIG. 5D is a schematic view of a radiation portion 130*d* according to a fifth embodiment of the present disclosure. The Radiation portion 130 can adopt different types of antennas according to the user's needs. As shown in FIG. 5A, in the second embodiment, the radiation portion 130*a* is a couple antenna. The difference between the radiation portion 130*a* and the radiation portion 130 of the first embodiment is that the third branch 133 and the fourth branch 134 are both inverted L-shaped, and the third branch 133 and the fourth branch 134 are not connected to the first branch 131. One end of the third branch 133 is connected to the system ground 20, and another end of the third branch 133 is not directly connected to the feeding portion 110. Instead, it is coupled to the feeding portion 110 through the second branch 132**.

As shown in FIG. 5B, in the third embodiment, the radiation portion **130*b* is a monopole antenna. The difference between the radiation portion 130*b* and the radiation portion 130 of the first embodiment is that the radiation portion 130*b* only has the first branch 131 and the second branch 132**.

As shown in FIG. 5C, in the fourth embodiment, the radiation portion **130*c* is a loop antenna. The difference between the radiation portion 130*c* and the radiation portion 130 of the first embodiment is that one end of the third branch 133 is connected to the first branch 131, and another end of the third branch 133 is connected to the system ground 20. One end of the fourth branch 134 is connected to the first branch 131, and another end of the fourth branch 134 is connected to the system ground 20**.

As shown in FIG. 5D, in the fifth embodiment, the radiation portion **130*d* is a planar inverted-F antenna (PIFA). The difference between the radiation portion 130*d* and the radiation portion 130 of the first embodiment is that the radiation portion 130*d* only has a first branch 131, a second branch 132, and a fourth branch 134. The fourth branch 134 is in an inverted L-shape. One end of the fourth branch 134 is connected to the second branch 132, and another end of the fourth branch 134 is connected to the system ground 20**.

It is noted that the feeding portion 110 of the antenna structure 100 may be designed to be connected to the grounding portion 120 or not, depending on the type of antenna of the radiation portion 130. When the radiation portion 130 is a couple antenna or a monopole antenna (radiation portion **130*a*, 130*b*), the radiation portion 130*a*, 130*b* is connected to the grounding portion 120 through the feeding portion 110. When the radiation portion 130 is a planar inverted F-type antenna or a loop antenna (radiation portion 130*c*, 130*d*), the radiation portion 130*a*, 130*b* form a loop connection with the grounding portion 120 and the feeding portion 110. That is, one end of the radiation portion 130*c*, 130*d* is connected to the grounding portion 120 through the feeding portion 110. Another end of the radiation portion 130*c*, 130*d* is directly connected to the grounding portion 120**.

Figure 6:
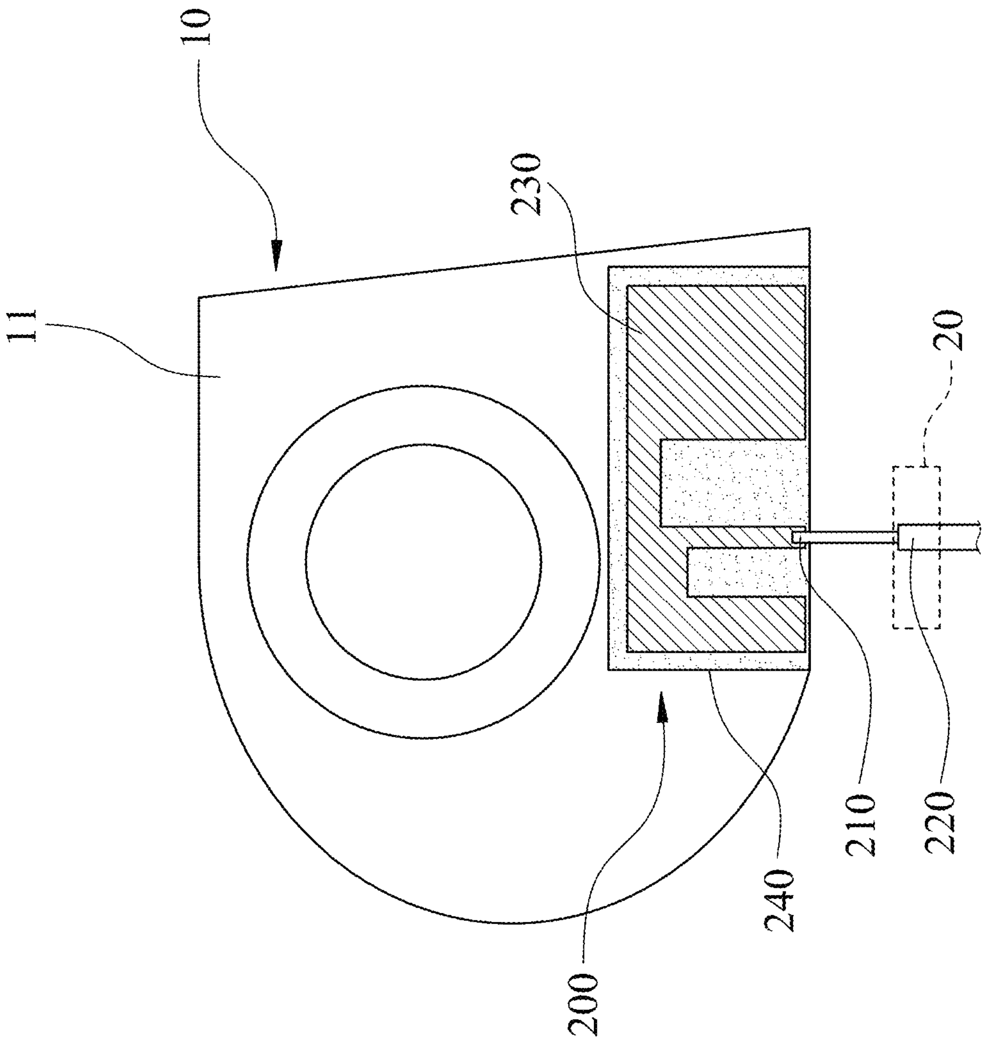
FIG. 6 is a schematic view of an antenna structure according to a sixth embodiment of the present disclosure.

Referring to FIG. 6. FIG. 6 is a schematic view of the antenna structure 200 according to a sixth embodiment of the present disclosure. The antenna structure 200 includes a feeding portion 210, a grounding portion 220, and a radiation portion 230. The difference between the antenna structure 200 of the sixth embodiment and the antenna structure 100 of the first embodiment is that the antenna structure 200 further includes a substrate 240. The radiation portion 230 is a patch antenna. The substrate 240 is disposed on the top cover 11 for disposing the radiation portion 230. In the sixth embodiment, the substrate 240 may be a printed circuit board (PCB) or a flexible printed circuit (FPC), but the present disclosure is not limited thereto. In addition, the feeding portion 210, the grounding portion 220, and the radiation portion 230 are respectively the same as the feeding portion 110, the grounding portion 120, and the radiation portion 130, which will not be repeated herein.

Figure 7:
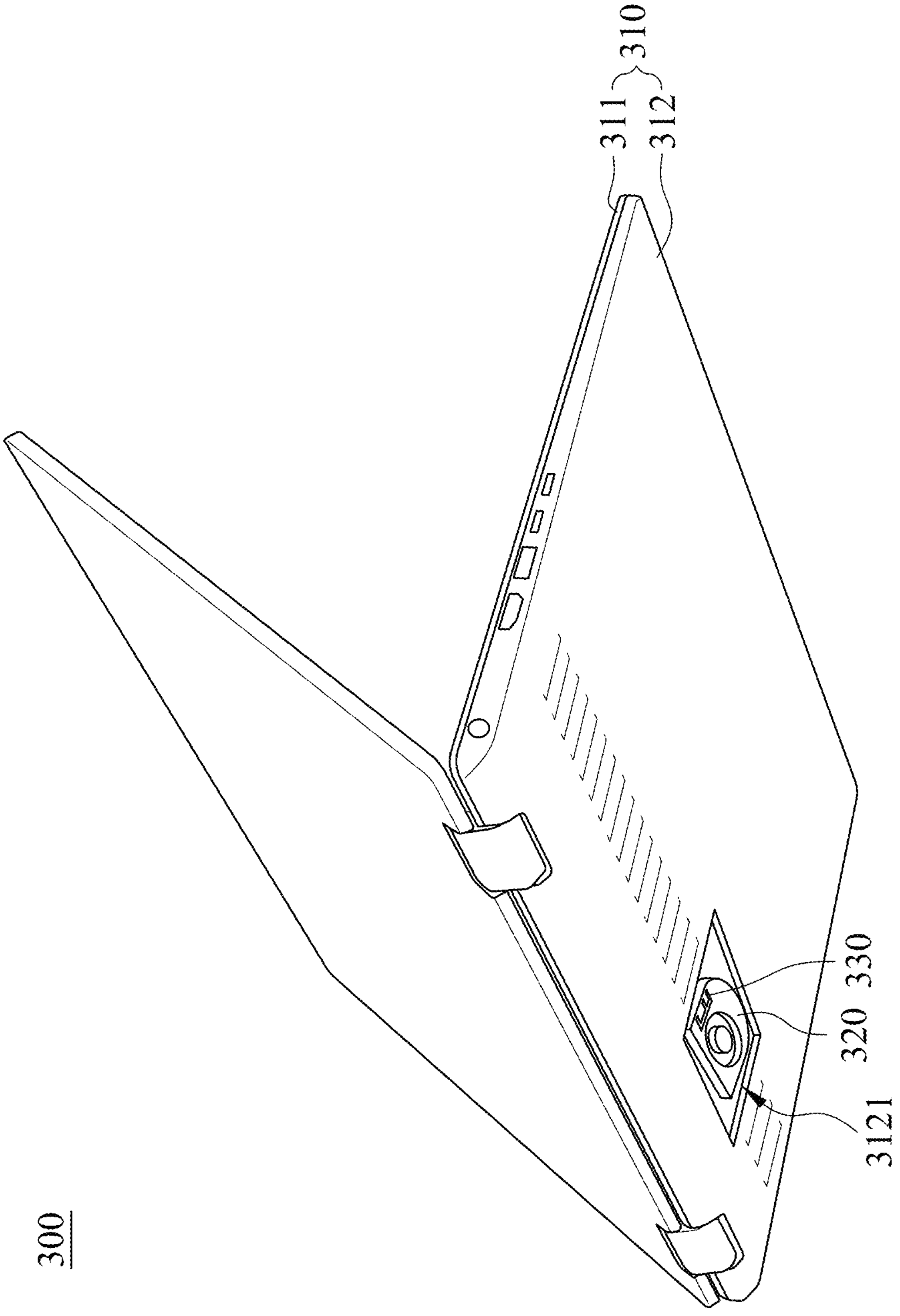
FIG. 7 is a schematic view of an electronic device according to a seventh embodiment of the present disclosure.
Figure 8:
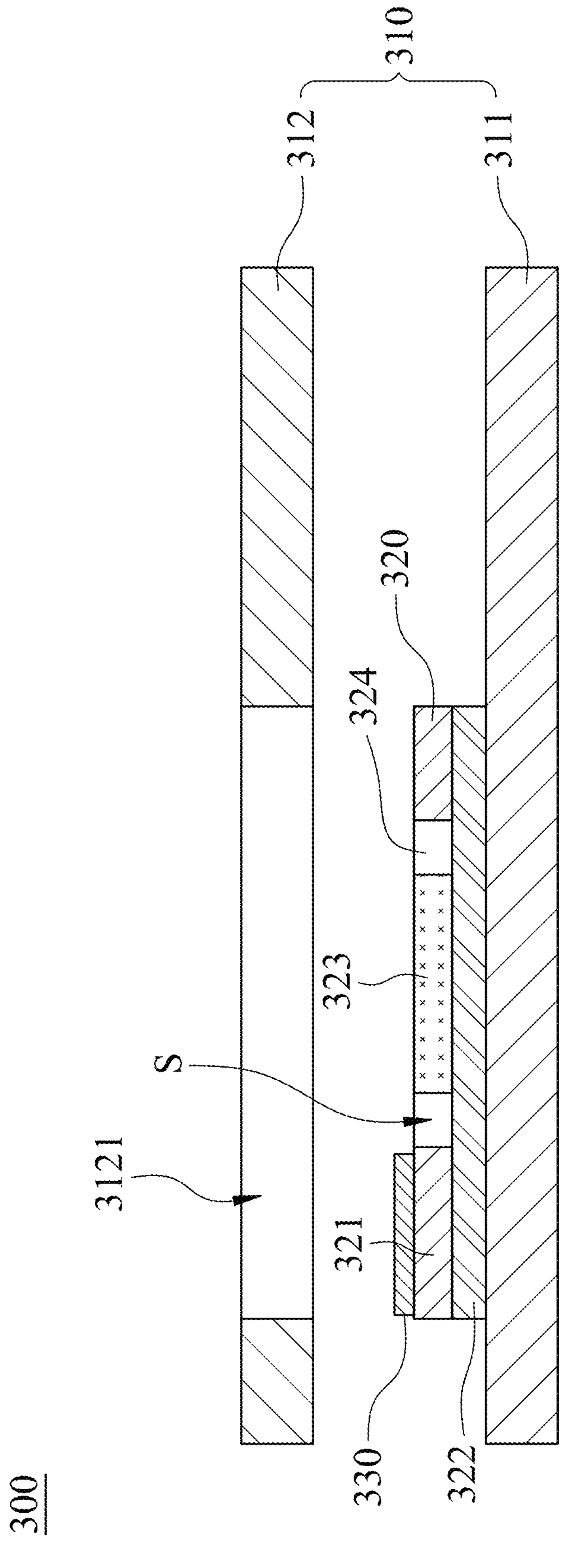
FIG. 8 is a schematic side view of a housing, a heat sink, and an antenna structure of FIG. 7.
Figure 9:
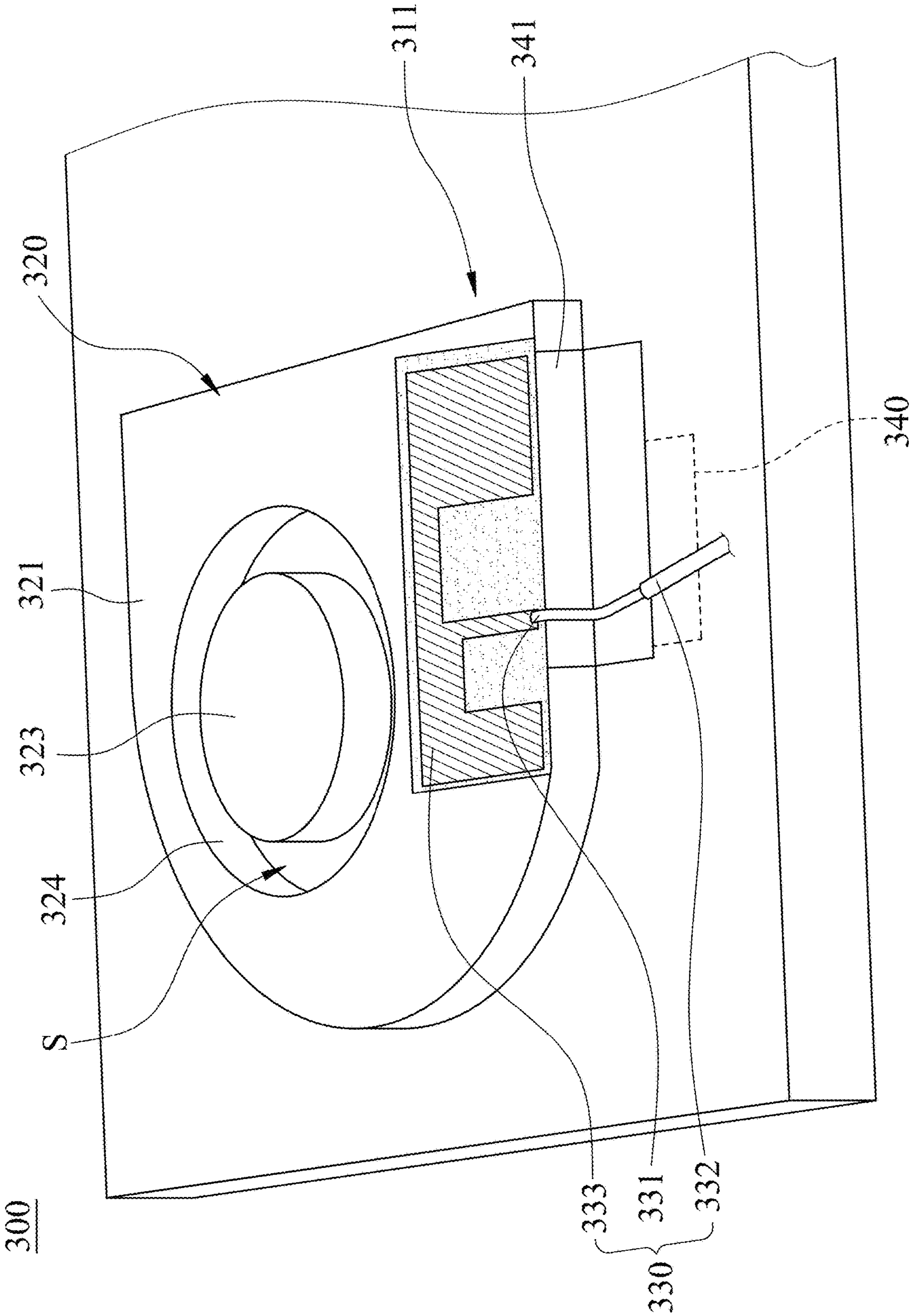
FIG. 9 is a schematic view of the heat sink and the antenna structure of FIG. 7.

Referring to FIG. 7 to FIG. 9. FIG. 7 is a schematic view of an electronic device 300 according to a seventh embodiment of the present disclosure. FIG. 8 is a schematic side view of a housing 310, a heat sink 320, and an antenna structure 330 of FIG. 7. FIG. 9 is a schematic view of the heat sink 320 and the antenna structure 330 of FIG. 7. The electronic device 300 includes the housing 310, the heat sink 320, and the antenna structure 330. The heat sink 320 and the antenna structure 330 are disposed in the housing 310. The housing 310 includes a first cover 311 and a second cover 312, and the second cover 312 is relative to the first cover 311. The heat sink 320 is disposed on the first cover 311 and includes a top cover 321, a bottom cover 322, and a fan 323. The bottom cover 322 is made of metal and is relative to the top cover 321. The fan 323 is disposed in an accommodating space S between the top cover 321 and the bottom cover 322. The antenna structure 330 is disposed on the heat sink 320 and faces the second cover 312, and includes a feeding portion 331, a grounding portion 332, and a radiation portion 333. One end of the feeding portion 331 is connected to the radiation portion 333, and another end of the feeding portion 331 is connected to the grounding portion 332. A vertical projection of the radiation portion 333 is completely overlapped with the top cover 321 of the heat sink 320 (as shown in FIG. 9). In the seventh embodiment, the electronic device 300 is a notebook computer. The first cover 311 of the housing 310 is the C surface of the notebook computer. The second cover 312 of the housing 310 is a D surface of the notebook computer, but the present disclosure is not limited thereto. It is noted that the antenna structure 330 can be the antenna structure 100, 200 of the first embodiment and the sixth embodiment, which will not be repeated herein.

In addition, as shown in FIG. 8, the second cover 312 has a window 3121. The position of the window 3121 corresponds to the heat sink 320. Specifically, through the window 3121, the second cover 312 can retain a non-metallic space with the same size as the heat sink 320, thereby preventing the antenna radiation of the radiation portion 333 from being interfered by metal components and affecting transmission.

In addition, as shown in FIG. 8 and FIG. 9, the heat sink 320 may further include a slot 324. The slot 324 is jointly defined in the accommodating space S by the top cover 321, the bottom cover 322, and the fan 323. Therefore, the impedance matching of the antenna structure 330 can be increased through the slot 324.

Further, as shown in FIG. 9, the electronic device 300 may further include a system ground 340. The system ground 340 is disposed on the first cover 311 and includes an extension portion 341. The extension portion 341 extends to one side of the top cover 321 of the heat sink 320 for the grounding portion 332 of the antenna structure 330 to connect. Therefore, the antenna structure 330 can be fixed entirely on the heat sink 320, without additional wire bond to the first cover 311, thereby avoiding the problem of wire breakage when the electronic device 300 is moved.

As can be seen from the above embodiments, the antenna structures of the present disclosure can be combined with the existing heat sink of the electronic device by completely overlapping the radiation portion with the top cover of the heat sink so as to overcome the problem of limited antenna position, and provide transmission signals of multiple frequency bands.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure disposed on a heat sink, the antenna structure comprising:
- a feeding portion;
- a grounding portion connected to the feeding portion; and
- a radiation portion, a vertical projection of the radiation portion being completely overlapped with a top cover of the heat sink, the radiation portion comprising:
  - a first branch;
  - a second branch, one end of the second branch being vertically connected to the first branch, and another end of the second branch being connected to the feeding portion;
  - a third branch, one end of the third branch being vertically connected to one end of the first branch; and
  - a fourth branch, one end of the fourth branch being vertically connected to another end of the first branch, and the second branch being spaced between the third branch and the fourth branch;
- wherein, the radiation portion has a high-frequency path and a low-frequency path, the high-frequency path is formed among the feeding portion, the second branch, the first branch, the third branch, and the grounding portion, and the low-frequency path is formed among the feeding portion, the second branch, the first branch, the fourth branch, and the grounding portion.

2. The antenna structure according to claim 1, wherein the first branch is configured to excite a first resonant frequency and a second resonant frequency;
- wherein the first resonant frequency is lower than the second resonant frequency, and the second resonant frequency is a multiple of the first resonant frequency.

3. The antenna structure according to claim 2, wherein the first resonant frequency is between 2.4 GHz and 2.5 GHz, and the second resonant frequency is between 5.15 GHz and 6 GHz.

4. The antenna structure according to claim 2, wherein a length of the first branch corresponds to one-half a wavelength of the first resonant frequency, and the length is 36 mm.

5. The antenna structure according to claim 1, wherein the high-frequency path is configured to excite a third resonant frequency, and the low-frequency path is configured to excite a fourth resonant frequency;

wherein the fourth resonant frequency is lower than the third resonant frequency.

6. The antenna structure according to claim 5, wherein the third resonant frequency is between 6.6 GHz and 7.125 GHz, and the fourth resonant frequency is between 6 GHz and 6.6 GHz.

7. The antenna structure according to claim 1, further comprising:

a substrate disposed on the top cover for disposing the radiation portion.

8. An electronic device, comprising:

a housing, comprising:

a first cover; and a second cover relative to the first cover;

a heat sink disposed on the first cover and comprising:

a top cover;

a bottom cover relative to the top cover; and a fan disposed in an accommodating space between the top cover and the bottom cover;

wherein the top cover, the bottom cover, and the fan jointly define a slot in the accommodating space, and the bottom cover is made of metal; and an antenna structure disposed on the heat sink and facing the second cover, and the antenna structure comprising:

a feeding portion;

a grounding portion connected to the feeding portion; and a radiation portion, a vertical projection of the radiation portion being completely overlapped with the top cover of the heat sink, the radiation portion comprising:

a first branch;

a second branch, one end of the second branch being vertically connected to the first branch, and another end of the second branch being connected to the feeding portion;

a third branch, one end of the third branch being vertically connected to one end of the first branch; and a fourth branch, one end of the fourth branch being vertically connected to another end of the first branch, and the second branch being spaced between the third branch and the fourth branch;

wherein, the radiation portion has a high-frequency path and a low-frequency path, the high-frequency path is formed among the feeding portion, the second branch, the first branch, the third branch, and the grounding portion, and the low-frequency path is formed among the feeding portion, the second branch, the first branch, the fourth branch, and the grounding portion.

9. The electronic device according to claim 8, wherein the first branch is configured to excite a first resonant frequency and a second resonant frequency;

wherein the first resonant frequency is lower than the second resonant frequency, and the second resonant frequency is a multiple of the first resonant frequency.

10. The electronic device according to claim 9, wherein the first resonant frequency is between 2.4 GHz and 2.5 GHz, and the second resonant frequency is between 5.15 GHz and 6 GHz.

11. The electronic device according to claim 9, wherein a length of the first branch corresponds to one-half a wavelength of the first resonant frequency, and the length is 36 mm.

12. The electronic device according to claim 8, wherein the high-frequency path is configured to excite a third resonant frequency, and the low-frequency path is configured to excite a fourth resonant frequency;

wherein the fourth resonant frequency is lower than the third resonant frequency.

13. The electronic device according to claim 12, wherein the third resonant frequency is between 6.6 GHz and 7.125 GHz, and the fourth resonant frequency is between 6 GHz and 6.6 GHz.

14. The electronic device according to claim 8, wherein the antenna structure further comprises:

a substrate disposed on the top cover for disposing the radiation portion.

15. The electronic device according to claim 8, further comprising:

a system ground comprising an extension portion extending to one side of the top cover of the heat sink;

wherein the grounding portion of the antenna structure is connected to the extension portion.

16. The electronic device according to claim 8, wherein the second cover is provided with a window corresponding to the heat sink.

* * * * *